(12) United States Patent
Stadermann et al.

(10) Patent No.: US 11,629,778 B2
(45) Date of Patent: Apr. 18, 2023

(54) BELT TENSIONING DEVICE WITH A BELT DRIVE

(71) Applicant: Muhr und Bender KG, Attendorn (DE)

(72) Inventors: Florian Stadermann, Attendorn (DE); Joachim Jud, Daaden (DE); Simon Pfeifer, Plettenberg (DE); Manfred Jung, Westerburg (DE)

(73) Assignee: Muhr und Bender KG, Attendorn (DE)

( * ) Notice: Subject to any disclaimer, the term of this patent is extended or adjusted under 35 U.S.C. 154(b) by 0 days.

(21) Appl. No.: 17/372,731

(22) Filed: Jul. 12, 2021

(65) Prior Publication Data

US 2022/0018421 A1     Jan. 20, 2022

(30) Foreign Application Priority Data

Jul. 20, 2020 (DE) ..................... 10 2020 004 335.6

(51) Int. Cl.
*F16H 7/12*     (2006.01)
*F16H 7/08*     (2006.01)

(52) U.S. Cl.
CPC ..... *F16H 7/1209* (2013.01); *F16H 2007/081* (2013.01); *F16H 2007/0804* (2013.01);
(Continued)

(58) Field of Classification Search
CPC ................ F16H 7/08; F16H 2007/081; F16H 2007/0804; F16H 2007/084;
(Continued)

(56) References Cited

U.S. PATENT DOCUMENTS 6,609,988 B1 * 8/2003 Liu ........................ F16H 7/1218
    474/135
6,648,783 B1 * 11/2003 Bogner ................ F16H 7/1281
    474/134

(Continued)

FOREIGN PATENT DOCUMENTS

CN     105179619 A  * 12/2015  ............... F16H 7/08
CN     107654596 A  *  2/2018
(Continued)

*Primary Examiner* — Michael R Mansen
*Assistant Examiner* — Raveen J Dias
(74) *Attorney, Agent, or Firm* — Bejin Bieneman PLC

(57) ABSTRACT

A belt tensioning device includes a first tensioning arm mounted on a base body pivotably about a first pivot axis and includes a rotatable first tensioning roller. A second tensioning arm is pivotably mounted relative to the base body about a second pivot axis and includes a rotatable second tensioning roller. Via a spring arrangement between the first tensioning arm and the second tensioning arm, the first and second tensioning arms are resiliently supported against one another in the circumferential direction. A damping mechanism is operatively arranged between the base body and the first tensioning arm for damping relative rotational movement between the first tensioning arm and the base body.
The damping mechanism generates a varying damping torque dependent on the rotational position and/or rotational direction of the first tensioning arm relative to the base body upon pivoting of the first tensioning arm relative to the base body.

18 Claims, 11 Drawing Sheets

(52) U.S. Cl.
CPC .............. *F16H 2007/0865* (2013.01); *F16H 2007/0874* (2013.01); *F16H 2007/0893* (2013.01)

(58) Field of Classification Search
CPC ..... F16H 2007/0863; F16H 2007/0865; F16H 2007/0874; F16H 2007/0893; F16H 7/0829; F16H 7/0831; F16H 7/0838; F16H 7/12; F16H 7/1209; F16H 7/1218; F16H 7/1245; F16H 7/1281
See application file for complete search history.

(56) References Cited

U.S. PATENT DOCUMENTS

| | | | | |
|---|---|---|---|---|
| 7,104,909 | B2 * | 9/2006 | Asbeck | F16H 7/1218 |
| | | | | 474/135 |
| 7,367,908 | B2 * | 5/2008 | Lemberger | F16H 7/1218 |
| | | | | 474/138 |
| 7,371,199 | B2 * | 5/2008 | Joslyn | F16H 7/1218 |
| | | | | 474/135 |
| 8,092,328 | B2 * | 1/2012 | Dec | F16H 7/1218 |
| | | | | 474/135 |
| 8,267,821 | B2 * | 9/2012 | Gresley | F16H 7/1218 |
| | | | | 474/133 |
| 9,618,099 | B2 * | 4/2017 | Ward | F16H 7/1218 |
| 9,810,296 | B2 * | 11/2017 | Pfeifer | F16H 7/08 |
| 9,976,634 | B2 * | 5/2018 | Leucht | F16H 7/0838 |
| 10,520,066 | B2 * | 12/2019 | Walter | F02B 67/06 |
| 10,920,860 | B2 * | 2/2021 | Stadermann | F16H 7/12 |
| 2002/0039944 | A1 * | 4/2002 | Ali | F16H 7/1209 |
| | | | | 474/135 |
| 2003/0008739 | A1 * | 1/2003 | Asbeck | F16H 7/1218 |
| | | | | 474/135 |
| 2003/0078124 | A1 * | 4/2003 | Serkh | F16H 7/1218 |
| | | | | 474/135 |
| 2005/0043131 | A1 * | 2/2005 | Asbeck | F16H 7/1218 |
| | | | | 474/135 |
| 2005/0059518 | A1 * | 3/2005 | Joslyn | F16H 7/1218 |
| | | | | 474/135 |
| 2006/0079360 | A1 * | 4/2006 | Jung | F16H 7/1218 |
| | | | | 474/138 |
| 2007/0249446 | A1 * | 10/2007 | Hao | F16H 7/1218 |
| | | | | 474/135 |
| 2008/0058141 | A1 * | 3/2008 | Pendergrass | F16H 7/1281 |
| | | | | 474/135 |
| 2008/0058142 | A1 * | 3/2008 | Joslyn | F16H 7/1281 |
| | | | | 474/135 |
| 2009/0298631 | A1 * | 12/2009 | Jud | F02B 67/06 |
| | | | | 474/135 |
| 2010/0323833 | A1 * | 12/2010 | Quintus | F16H 7/1218 |
| | | | | 474/135 |
| 2010/0331127 | A1 * | 12/2010 | Dec | F02B 67/06 |
| | | | | 474/135 |
| 2011/0015015 | A1 * | 1/2011 | Gresley | F16H 7/1218 |
| | | | | 474/133 |
| 2011/0201466 | A1 * | 8/2011 | Ishida | F16H 7/1218 |
| | | | | 474/113 |
| 2012/0058848 | A1 * | 3/2012 | Lannutti | F16H 7/1218 |
| | | | | 474/135 |
| 2013/0079185 | A1 * | 3/2013 | Schauerte | F16H 7/1281 |
| | | | | 474/135 |
| 2014/0274510 | A1 * | 9/2014 | Dutil | F16H 7/0831 |
| | | | | 474/135 |
| 2014/0315673 | A1 * | 10/2014 | Zacker | F16F 1/04 |
| | | | | 474/135 |
| 2015/0219189 | A1 | 8/2015 | Serkh et al. | |
| 2015/0276024 | A1 * | 10/2015 | Jiang | F16H 7/1218 |
| | | | | 474/135 |
| 2015/0308545 | A1 * | 10/2015 | Harvey | F16H 7/1218 |
| | | | | 474/117 |
| 2015/0345597 | A1 * | 12/2015 | Walter | F16H 7/1218 |
| | | | | 474/134 |
| 2016/0146312 | A1 * | 5/2016 | Pfeifer | F16H 7/08 |
| | | | | 474/135 |
| 2016/0273622 | A1 * | 9/2016 | Kim | F02B 67/06 |
| 2017/0016517 | A1 * | 1/2017 | Ward | F16H 7/1245 |
| 2017/0023108 | A1 * | 1/2017 | Bauerdick | F16H 7/0838 |
| 2017/0059015 | A1 * | 3/2017 | Oishi | F16H 7/1218 |
| 2017/0146100 | A1 * | 5/2017 | Walter | F02B 67/06 |
| 2018/0010670 | A1 * | 1/2018 | Leucht | F16H 7/0831 |
| 2019/0017579 | A1 * | 1/2019 | Stadermann | F16H 7/1281 |
| 2019/0078667 | A1 * | 3/2019 | Liu | F16H 7/18 |
| 2019/0120345 | A1 * | 4/2019 | Pfeifer | F16H 7/1218 |
| 2019/0145501 | A1 * | 5/2019 | Singh | F16H 7/08 |
| | | | | 474/134 |
| 2019/0162276 | A1 * | 5/2019 | Svamberk | F16C 33/76 |
| 2019/0242463 | A1 * | 8/2019 | Fischer | F16H 9/26 |
| 2019/0285147 | A1 * | 9/2019 | Singh | F16H 7/1218 |
| 2021/0018074 | A1 * | 1/2021 | Pfeifer | F16H 7/12 |
| 2021/0041010 | A1 * | 2/2021 | Koppeser | F16H 7/1209 |
| 2021/0123375 | A1 * | 4/2021 | Montani | F16H 7/1281 |

FOREIGN PATENT DOCUMENTS

| | | | | |
|---|---|---|---|---|
| CN | 108561518 A | * | 9/2018 | |
| CN | 112112941 A | * | 12/2020 | ............ F16H 7/14 |
| DE | 19926647 A1 | * | 12/2000 | ............ F16H 7/1218 |
| DE | 102008026064 A1 | | 12/2009 | |
| DE | 102012209028 A1 | | 12/2013 | |
| DE | 102015212084 A1 | | 12/2016 | |
| DE | 102017116000 A1 | | 1/2019 | |
| DE | 102017124783 B3 | | 3/2019 | |
| EP | 3431815 A1 | | 1/2019 | |
| JP | H06213296 A | | 8/1994 | |
| JP | 2007032704 A | | 2/2007 | |
| WO | 2014100894 A1 | | 7/2014 | |
| WO | WO-2021091569 A1 | * | 5/2021 | |

\* cited by examiner

BELT TENSIONING DEVICE WITH A BELT DRIVE

CROSS-REFERENCE TO RELATED APPLICATIONS

This application claims priority to German Application No. 10 2020 004 335.6, filed on Jul. 20, 2020, which application is hereby incorporated herein by reference in its entirety.

BACKGROUND AND SUMMARY

A belt tensioning device for a traction drive, in particular with a traction-driven starter generator, can comprise a base body and a first tensioning arm which is mounted on the base body such that it can pivot about a first pivot axis and which has a rotatable first tensioning roller. Furthermore, the belt tensioning device comprises a second tensioning arm which is pivotally mounted relative to the base body about a second pivot axis and which comprises a rotatable second tensioning roller. A spring arrangement of the belt tensioning device is arranged between the first tensioning arm and the second tensioning arm, via which the first tensioning arm and the second tensioning arm are resiliently supported against each other in the circumferential direction.

Such a belt tensioning device is known from DE 10 2015 212 084 A1, wherein the belt tensioning device described therein comprises two separate damping devices. On the one hand, a damping device which is effective between the two tensioning arms. On the other hand, a further damping device with sliding shells on the tensioning arm pretensioning spring. Thus, both damping devices are effective between the two tensioning arms.

From DE 10 2012 209 028 A1, a belt tensioning device is known which also has two separate damping devices. On the one hand, a damping device with sliding bearing shells is provided on a bow spring, with which a movement between the tensioning arms is damped. To prevent noise or a tensioning arm hitting the end of the working range, it is suggested to provide a spring with a non-linear spring characteristic or to increase the damping force towards the end of the working range during retraction. This concerns the movement of the two tensioning arms in relation to each other. On the other hand, a further damping device with friction linings and constant damping can be provided between the belt tensioner and the machine housing.

A belt tensioning device with two tensioning arms for a belt drive with starter generator is known from EP 3 431 815 A1. The belt tensioning device has a base body with a sleeve extension, on which a first tensioning arm is pivotally mounted by means of a radially elastic bearing bush. The bearing bush is non-rotatably connected to one of the parts, base body or first tensioning arm, and is rotatable relative to the other one of said parts. The second tensioning arm is pivotably mounted on the base body. The two tensioning arms are pretensioned against each other in the circumferential direction by a spring arrangement. Pretensioning means in the form of a leaf spring are provided, which are arranged radially between a circumferential surface of the bearing bushing and a circumferential surface of the part connected to the bearing bushing in a rotationally fixed manner. Low positional tolerances and good damping properties are achieved by the pretensioning means.

From DE 10 2017 124 783 B3, a tensioning device for tensioning a traction means of a traction drive is known. The tensioning device comprises a base body, two tensioning arms, each with a tensioning roller, and a spring arrangement with a first spring and a second spring, which are arranged to act between the two tensioning arms. When pivoting relatively within a first tensioning angle range, the two tensioning arms are only force-loaded against each other by the first spring. When pivoting relatively within a second tensioning angle range, the two tensioning arms are force-loaded against each other by the first spring and additionally by the second spring.

From WO 2014/100894 A1, a belt tensioning device is known having a base body, a first tensioning arm rotatably mounted thereon and a second tensioning arm pivotally mounted on the first tensioning arm. A damping structure is provided to dampen the first tensioning arm relative to the base body. In one embodiment, the damping structure includes a Belleville spring disposed between the first tensioning arm and the base body with axial pretension. In another embodiment, first and second annular bushings are provided which are axially biasable to dampen rotational movement of the first tensioning arm relative to the housing.

Traction drives in the form of belt drives for a motor vehicle have different belt forces in the individual strands or sides of the belt of the belt drive depending on the driving condition or operating situation (partial load, full load, starting, boost, recuperation, sailing, etc.). This applies in particular to belt drives in hybrid vehicles with a starter generator function. This leads to pivoting movements and vibrations of the belt tensioning device.

Depending on the operating situation, a belt tensioning device must meet various technical requirements. This is to prevent the belt tensioner from oscillating up or overshoot when starting. Furthermore, a good decoupling effect of the starter generator should be ensured during normal operation.

A belt tensioning device as disclosed herein has good damping properties under different operating conditions.

The belt tensioning device comprises:
a base body,
a first tensioning arm which is mounted on the base body such that it can pivot about a first pivot axis and which has a rotatable first tensioning roller,
a second tensioning arm which is pivotably mounted relative to the base body about a second pivot axis and which has a rotatable second tensioning roller,
a spring arrangement which is arranged between the first tensioning arm and the second tensioning arm and via which the first tensioning arm and the second tensioning arm are resiliently supported against one another in the circumferential direction,
a damping mechanism operatively arranged between a bearing surface of the base body and a bearing surface of the first tensioning arm for damping relative rotational movement between the first tensioning arm and the base body, wherein the damping mechanism generates a varying damping torque dependent on the rotational position and/or rotational direction of the first tensioning arm relative to the base body upon pivoting of the first tensioning arm relative to the base body.

Due to the damping torque varying depending on the rotational position and/or the rotational direction of the first tensioning arm relative to the base body, the damping mechanism can be designed in such a way that it provides damping adapted to the respective operating state of the belt drive.

In one embodiment of the belt tensioning device, the damping mechanism may be configured to generate a damping torque in a central rotational position of the first tensioning arm relative to the base body upon pivoting the first tensioning arm relative to the base body, which is smaller than the damping torque in at least one pivoted-out rotational position of the first tensioning arm relative to the base body other than the central rotational position.

The central rotational position of the first tensioning arm relative to the base body can be determined or defined, for example, as that rotational position which is established in the installed state of the belt tensioner in the belt drive on the basis of the equilibrium of forces acting on the belt tensioner, in particular when the belt drive is not driven. This rotational position can accordingly also be called normal or neutral rotational position. In a belt drive for a starter-generator, the starter-generator may be uncoupled from the belt drive during normal operation to minimize drag torques that would result in increased fuel consumption. In this normal operation, the tensioning arms will at least approximately assume their respective central rotational position.

In order to generate the lowest possible torques in this central rotational position, in particular in normal operation with the starter generator disconnected, the damping torque generated when the first tensioning arm is pivoted relative to the base body is smaller in the central rotational position than in pivoted-out rotational positions deviating from the central rotational position.

The pivoted-out rotational positions are assumed by the belt tensioning device in particular when the engine is started or in boost mode, in which the starter generator is operated as an electric motor and provides additional power, or in recuperation mode, in which the starter generator is operated as a generator.

In one embodiment of the belt tensioning device, different coefficients of friction exist between the bearing surface of the base body and the bearing surface of the first tensioning arm over the circumference.

In the installed state of the belt tensioning device in a belt drive, radial forces from the first tensioning arm act on the housing radially to the first pivot axis. If the bearing surface of the base body and the bearing surface of the first tensioning arm are cylindrical surfaces about the first pivot axis, the damping torque generated upon pivoting the first tensioning arm is determined by the frictional pairing of the bearing surfaces in the areas most heavily loaded by the radial forces. The bearing surface of the base body is arranged in a stationary position. For example, the base body may be attached to a unit, such as the starter generator. The position of the bearing surface of the base body thus remains unchanged in relation to the belt drive. On the other hand, the rotational position of the bearing surface of the first tensioning arm changes as soon as the first tensioning arm is pivoted. The radial force exerted by the first tensioning arm rotates with the first tensioning arm relative to the base body, so that in the different rotational positions of the first tensioning arm relative to the base body, different areas of the bearing surface of the base body are subjected to the highest load. Since different coefficients of friction exist over the circumference, different coefficients of friction can thus be realized for the different rotational positions of the first tensioning arm relative to the base body, so that different damping torques are produced.

The different coefficients of friction can be obtained by using different materials along the circumference of the bearing surfaces of the base body and/or the bearing surface of the first tensioning arm. Alternatively or additionally, the surface finish of the bearing surfaces may be designed to vary around the circumference, such as the roughness values.

The bearing surface of the base body and the bearing surface of the first tensioning arm may also be arranged in a plane transverse to the first pivot axis. In the installation position of the belt tensioning device in a belt drive, an axial force is also exerted on the base body, which runs parallel to the first pivot axis and thus gives rise to a tilting torque transverse to the first pivot axis. This tilting torque is supported by the bearing surfaces, which are oriented transversely to the first pivot axis, by supporting an axial force in a first direction parallel to the first pivot axis in a circumferential area and by supporting a second supporting force in the opposite direction in a side diametrically opposite to the first pivot axis. In these two highly loaded areas, the surface pairings of the bearing surfaces of the base body and the first tensioning arm define the resulting damping torque, so that the same applies here as for bearing surfaces that are designed and arranged in a cylindrical shape.

In another embodiment of the belt tensioning device, it is provided that a spring element is radially arranged between the base body and the first tensioning arm and is non-rotatably held at one of the base body and the first tensioning arm. In the central rotational position of the first tensioning arm relative to the base body, the spring element is arranged in circumferential overlap with a recess in the other one of the base body and the first tensioning arm. Further, in a pivoted-out rotational position of the first tensioning arm relative to the base body which differs from the central rotational position, the spring element is pretensioned and is arranged exerting a radial force between a bearing surface of the base body and a bearing surface of the first tensioning arm.

Since the spring element is arranged in overlapping with the recess in the central rotational position of the first tensioning arm, a lower radial tensioning force is exerted by the spring element between the bearing surface of the base body and the bearing surface of the first tensioning arm than in a pivoted-out rotational position deviating from the central rotational position, in which the spring element is only partially or not in overlapping with the recess. The recess ensures that the spring element is not pretensioned or is pretensioned to a lesser extent in the central rotational position of the first tensioning arm than in the rotational positions deviating from the central rotational position. It is also possible for the recess to be configured such that no pretension, or only less pretension, is applied over a central rotational position range that includes the central rotational position than is applied in rotational positions outside the central rotational position range.

The spring element can be radially resilient. The spring element may further be part of a tensioning arrangement, wherein the spring element resiliently supports a damping element radially and the damping element forms at least part of one of the bearing surfaces.

Several damping mechanisms can also be arranged around the circumference.

In one embodiment, a bearing surface of the base body and a bearing surface of the first tensioning arm may have the same cross-sectional shape in the circumferential direction, wherein the cross-section deviates from a circular shape.

In the central rotational position of the first tensioning arm, the bearing surface of the base body and the bearing surface of the first tensioning arm may be arranged in corresponding rotational positions with respect to each other, resulting in a predetermined bearing clearance. If the first tensioning arm were to rotate relative to the base body, the bearing clearance would be reduced over the circumference due to the non-circular cross-section and the frictional forces would increase, resulting in an increased damping torque. In this case, the bearing surfaces can have an ovality.

It would also be possible to have ramp surfaces between the bearing surfaces which reduce the bearing play when the first tensioning arm is pivoted.

The damping mechanism may also be configured such that, when the first tensioning arm is pivoted relative to the base body starting from a central rotational position of the first tensioning arm relative to the base body in the direction towards a pivoted-out rotational position deviating from the central rotational position, a higher damping torque is generated than when the first tensioning arm is pivoted relative to the base body starting from a pivoted-out rotational position of the first tensioning arm relative to the base body in the direction towards the central rotational position.

This ensures that a higher damping torque is generated when the first tensioning arm pivots out from the central rotational position than when it pivots back from a pivoted-out rotational position in the direction towards the central rotational position. This counteracts overshooting of the first tensioning arm in the direction of a pivoted-out rotational position, whereas a lower (or no) damping torque is applied to counteract pivoting back to the central rotational position.

In a further embodiment, it is provided that a damping element is arranged radially between the base body and the first tensioning arm and is held in a rotationally fixed manner by one of the base body and the first tensioning arm, and that the damping element is radially pretensioned in a first pivot direction of the first tensioning arm relative to the base body and is arranged to be radially released in a second pivot direction opposite to the first pivot direction.

Thus, a different damping torque is achieved depending on the direction of rotation of the first tensioning arm relative to the base body.

Such a damping element, which enables a variability of the damping torque dependent of the rotational direction, can also be used in addition to one of the above-mentioned embodiments with a damping torque dependent on the rotational position.

The second tensioning arm can be pivotally mounted on the base body in a manner comparable to the first tensioning arm, wherein a further damping mechanism is effectively arranged between the base body and the second tensioning arm in order to damp relative rotational movement between the second tensioning arm and the base body. In principle, the damping mechanism can be constructed identically to this described above in connection with the first tensioning arm.

Alternatively, the second tensioning arm may be pivotally mounted to the first tensioning arm about the second pivot axis so that they are pivotally mounted together as a unit to the base body via the first tensioning arm. In this regard, a further damping mechanism may be operatively disposed between the first tensioning arm and the second tensioning arm to damp relative rotational movement between the first tensioning arm and the second tensioning arm. The damping mechanism between the first tensioning arm and the second tensioning arm can be constructed in the same way as the damping mechanism between the first tensioning arm and the base body described above.

Thus, the damping mechanism between the first tensioning arm and the base body damp a pivotal movement of the assembly of the first tensioning arm and the second tensioning arm with respect to the base body, irrespective of whether there is a relative rotational movement between the first tensioning arm and the second tensioning arm. This dampens rotational movements and vibrations of the two tensioning arms relative to the base body in different operating states, such as starting operation, normal operation, and recuperation operation.

The further damping mechanism between the first tensioning arm and the second tensioning arm damps relative rotational movement between the first tensioning arm and the second tensioning arm in response to changes in tensioning force or oscillations in tensioning force.

Further, the problem is solved by a belt drive comprising a belt drivingly wound around a plurality of pulleys and a belt tensioning device according to one of the embodiments described above for tensioning the belt, wherein a central rotational position of the first tensioning arm relative to the base body is that rotational position which is established at standstill in the installed state due to the equilibrium of forces acting on the belt tensioning device.

BRIEF SUMMARY OF THE DRAWINGS

Example embodiments are explained in more detail below with reference to the figures.

DESCRIPTION

Figure 1:
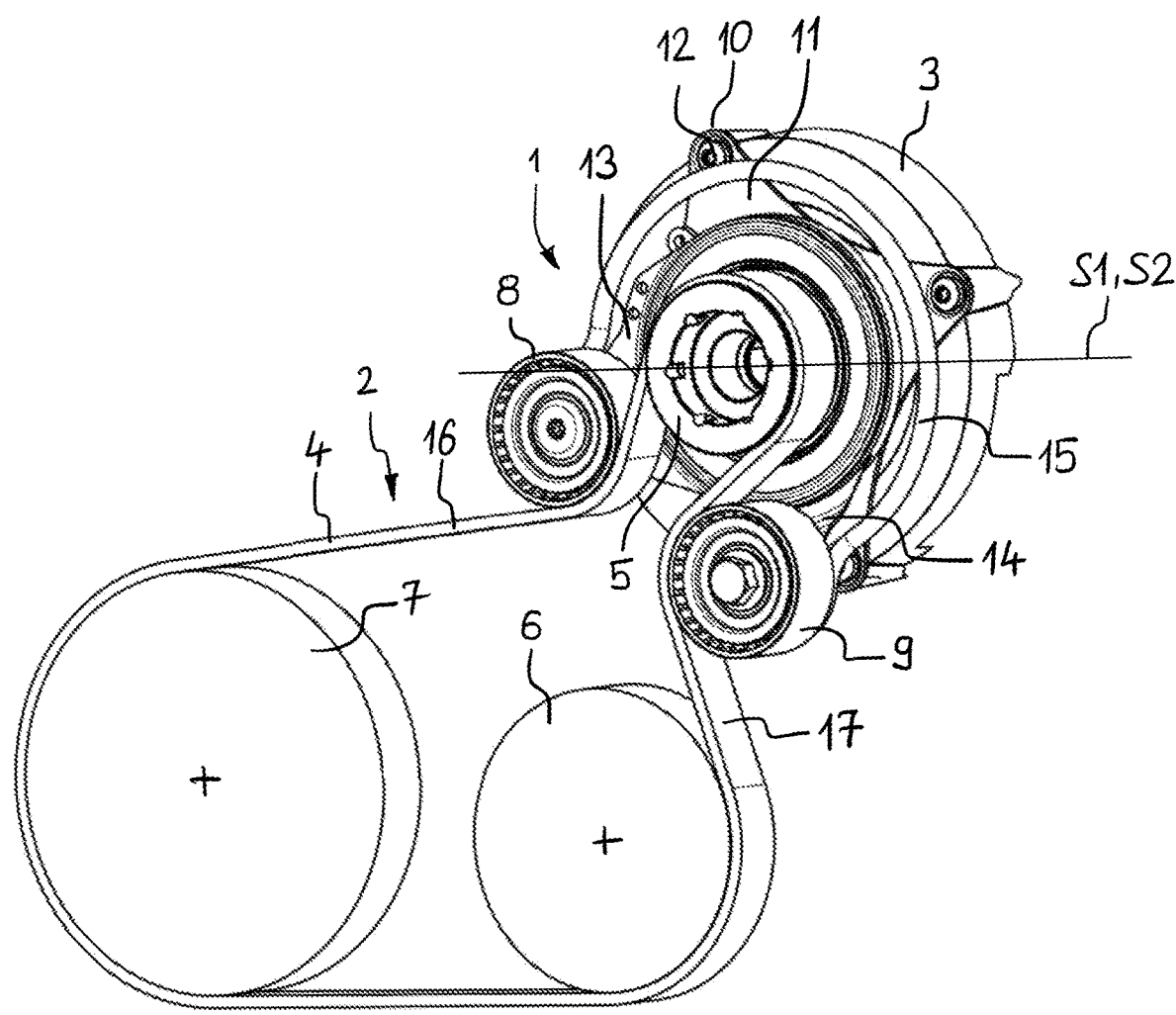
FIG. 1 is a perspective view of a belt drive with a belt tensioning device in the installed state.

FIG. 1 shows a belt tensioning device 1 in an installed state in a belt drive 2 shown schematically and in simplified form. For this purpose, the belt tensioning device 1 is attached to a stationary component, in this case to a unit in the form of a starter generator 3 (partially shown here). A belt 4 of the belt drive 2 is laid around pulleys 5, 6, 7. Tension rollers 8, 9 are spring-loaded against the belt 4. The belt tensioning device 1 is attached to the front face of the starter generator 3. This is done by means of circumferentially distributed fastening lugs 10 of a base body 11, screws 12 being inserted through bores in the fastening lugs 10 and screwed to the starter generator 3.

A first tensioning arm 13 is mounted on the base body 11 so as to be pivotable about a first pivot axis S1, the first tensioning arm 13 carrying the first tensioning roller 8 at a radial distance from the first pivot axis S1. Furthermore, the belt tensioning device 1 has a second tensioning arm 14 which is mounted on the first tensioning arm 13 so as to be pivotable about a second pivot axis S2 relative to the base body 11 and carries the second tensioning roller 9 at a radial distance from the second pivot axis S2. In the embodiment shown, the first pivot axis S1 and the second pivot axis S2 are arranged coaxially with respect to each other. Further, one of the pulleys 5 driven by or driving the starter generator 3 is rotatably mounted coaxially with the pivot axes S1, S2.

A spring arrangement with a spring 15 is arranged between the first tensioning arm 13 and the second tensioning arm 14, via which the first tensioning arm 13 and the second tensioning arm 14 are resiliently supported against one another in the circumferential direction about the pivot axes S1, S2. In the installed state shown, the tensioning rollers 8, 9 are forced inwardly against different strands or sides 16, 17 of the belt drive 4 to tension the belt 4.

Figure 2:
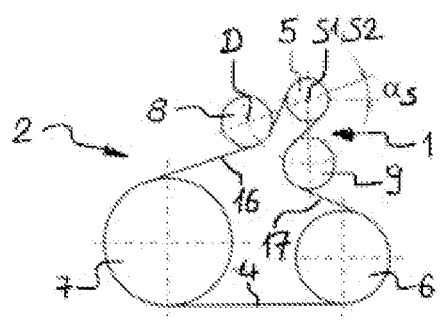
FIG. 2 is a front view of a schematic representation of the belt drive according to FIG. 1 in a starting mode.

FIG. 2 shows a front view of a schematic representation of the belt drive 2 according to FIG. 1 in a starting mode. In the starting mode, the starter generator not shown here drives the belt drive 2 clockwise via a first pulley 5 of the three pulleys 5, 6, 7 of the belt drive 2. A first strand or side 16 of the belt 4, tensioned by the first tensioning roller 8, is here the load strand (tight span) and a second strand or side 17, tensioned by the second tensioning roller 9, is the loose strand (slack span).

Figure 3:
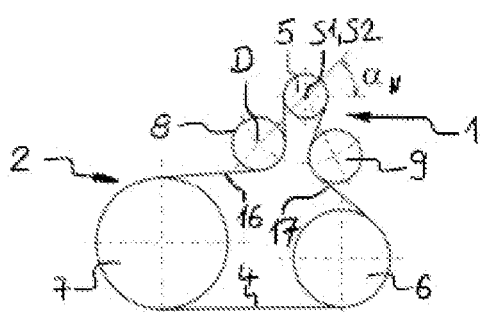
FIG. 3 is a front view of a schematic representation of the belt drive according to FIG. 1 in normal operation.

FIG. 3 shows the same belt drive as FIG. 2 in normal operation. In normal operation, the starter generator is decoupled from the belt drive 2 in terms of drive and therefore does not apply an external torque to it. In this normal operation, the tensioning arms of the belt tensioning device 1, which are not shown here, each assume a central rotational position which is established due to the equilibrium of forces. With regard to the first tensioning arm with the first tensioning roller 8, in the example shown in FIG. 3, between a straight line connecting the first pivot axis S1 to an axis of rotation D of the first tensioning roller 8 and a horizontal line shown in FIG. 3, there is an angle $\alpha_N$ corresponding to the central rotational position of the first pivot arm.

On the other hand, in the starting mode according to FIG. 2, the first tensioning arm is rotated clockwise, since due to the higher belt force in the first strand (first side of the belt) 16, which is the load strand (tight span), the first tensioning arm is pivoted clockwise by the first tensioning roller 8 from the central rotational position shown in FIG. 3 to a pivoted-out rotational position shown in FIG. 2. Here, a smaller angle $\alpha_S$ between the connecting line and the horizontal line is established than in normal operation. Because the pretensioning force for tensioning the belt 4 remains unchanged, the second tensioning arm with the second tensioning roller 9 also rotates clockwise without changing the angle between the two tensioning arms.

Figure 4:
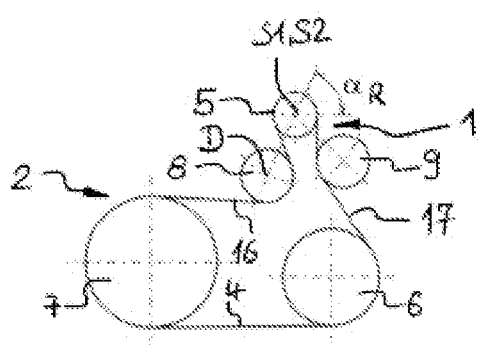
FIG. 4 is a front view of a schematic representation of the belt drive according to FIG. 1 in a recuperation mode.

FIG. 4 shows the belt drive 2 in a recuperation mode in which the starter generator operates as a generator and is driven by the belt drive 2. In the recuperation mode, the second strand or side 17 is the load strand (tight span) and the first strand or side 16 is the loose strand (slack span). Therefore, due to the higher belt forces within the second strand or side 17 compared to the first strand or side 16, the two tensioning arms are rotated counterclockwise, resulting in an angle $\alpha_R$ corresponding to another pivoted-out rotational position of the first tensioning arm shown in FIG. 4, which is larger than the angle $\alpha_N$ in normal operation.

Figure 5:
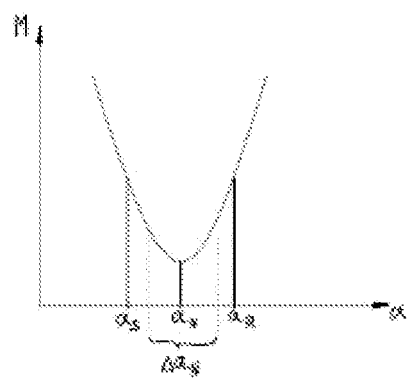
FIG. 5 is a diagram of the damping torque curve over the rotational position of the first tensioning arm.
Figure 6:
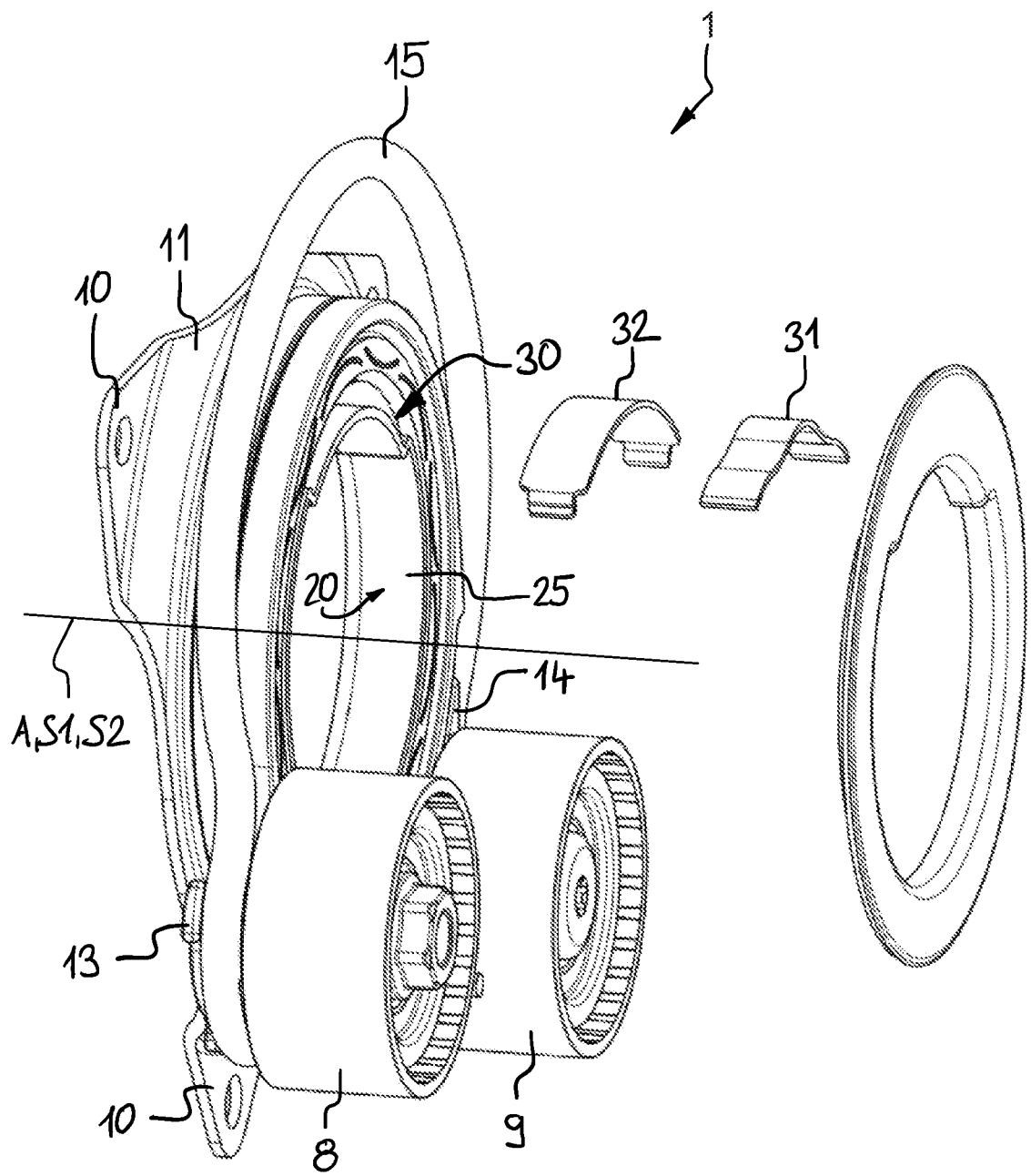
FIG. 6 is an exploded perspective view of a first embodiment of a belt tensioning device.
Figure 7:
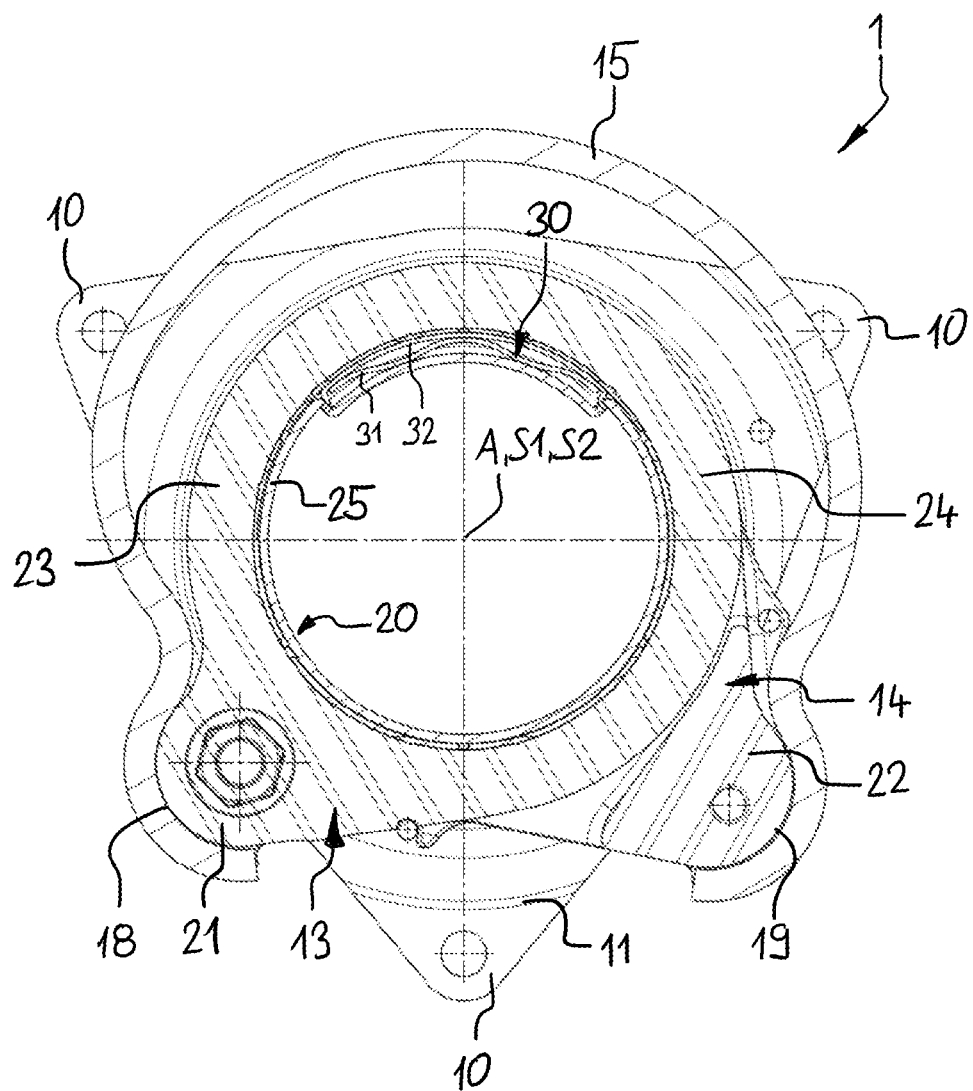
FIG. 7 is a cross-section of the belt tensioning device according to FIG. 6.

FIG. 5 shows a diagram of the course of the damping torque M over the angle α of the rotational position of the first tensioning arm. In the normal operation at the central rotational position of the first tensioning arm, the angle $\alpha_N$ is set at which the damping torque has a minimum. In normal operation, oscillations occur so that the first tensioning arm oscillates within a central rotational position range over the angular range $\Delta\alpha_N$ about the central rotational position with the angle $\alpha_N$. In rotational positions deviating from the central rotational position within the rotational position range, the damping torque already increases. In the rotational position with angle $\alpha_S$ in the starter mode, the damping torque M is increased even further than in the central rotational position range. The same is true for the rotational position with angle $\alpha_R$ in recuperation mode.

FIGS. 6 to 9, which will be described together below, show a first embodiment of a belt tensioning device 1 in various views. The belt tensioning device 1 comprises a base body 11, a first tensioning arm 13 with a first tensioning roller 8, a second tensioning arm 14 with a second tensioning roller 9 and a spring arrangement with a spring 15, via which the two tensioning arms 13, 14 are resiliently supported against one another in the circumferential direction. The spring 15 extends circumferentially about an axis A of the belt tensioning device 1 between a first spring support 18 of the first tensioning arm 13 and a second spring support 19 of the second tensioning arm 14.

The base body 11 may be attached to a stationary component such as a power unit, for example in the form of a starter generator of a main engine of a motor vehicle. The unit can in principle be any machine that is part of the belt drive, i.e. in particular any of the auxiliary units driven by the main engine of the motor vehicle, such as a generator, water pump or the like. For connection to the stationary component, the base body 11 has fastening lugs 10 formed with holes through which screws can be passed for attachment to the stationary component.

The two tensioning arms 13, 14 of the belt tensioning device 1 are mounted via corresponding bearing means so as to be pivotable or rotatable relative to one another or relative to the base body 11, respectively, about a first pivot axis S1 and a second pivot axis S2. The base body 11, the first tensioning arm 13 and/or the second tensioning arm 14 can be manufactured as steel components, which can in particular be manufactured from sheet metal by forming, or light metal components, in particular from a cast aluminum alloy, or from plastic, in particular a fiber-reinforced plastic.

The first tensioning arm 13 is mounted to pivot about the first pivot axis S1 by means of a first bearing. The second tensioning arm 14 is pivotally mounted about the second pivot axis S2 by means of a second bearing. Here, both bearings are arranged coaxially to each other, i.e. both pivot axes S1, S2 coincide. In principle, however, for certain applications it is also possible that the two pivot axes can be arranged parallel or eccentrically to each other.

The spring 15 extending in the circumferential direction about the pivot axes S1, S2 counteracts a relative pivoting movement of the two tensioning arms 13, 14. The two tensioning arms 13, 14 are limitedly rotatable relative to each other by the interposed spring 15 and, together with the spring 15, are free to rotate relative to the base body 1 about the pivot axes S1, S2, that is, through 360° and more. It is provided that the pivot axes S1, S2 are located within an opening 20 of the base body 11 when the belt tensioning device 1 is assembled.

The tensioning arms 13, 14 each have a support portion 21, 22 projecting radially outwardly from an annular portion 23, 24 of the respective tensioning arm 4, 6. One of the tensioning rollers 8, 9 is mounted on each of the support portions 21, 22 so as to be rotatable about at least substantially parallel axes of rotation D1, D2.

The base body 11 has a substantially sleeve-shaped central projection 25, which is arranged coaxially with the axis A of the base body 11. The central projection 25 extends in the direction of the axis A. A bearing sleeve 26 is arranged on the central projection 25 and is connected to the central projection 25 in a rotationally fixed manner. The bearing sleeve 26 forms an outwardly facing outer bearing surface 27 of the central projection 25.

On the central projection 25 of the base body 11 and on the bearing sleeve 26, the annular portion 23 of the first tensioning arm 13 is mounted so as to pivot about the first pivot axis S1 by means of a damping element 28, the first pivot axis S1 coinciding with the axis A. The damping element 28 has a sleeve-like configuration and is non-rotatably connected to the annular portion 23 of the first tensioning arm 13. The damping element 28 forms an inwardly facing inner bearing surface 29 of the first tensioning arm 13, with which the damping element 28 is in sliding contact on the outer bearing surface 27 of the bearing sleeve 26, thus forming a bearing.

A damping mechanism 33 is provided in the bearing over a limited circumferential area. For this purpose, the bearing sleeve 26 and the central projection 25 form a circumferentially limited recess 30 formed by a radially inwardly offset portion of the central projection 25 and the bearing sleeve 26. A radially resilient spring element 31 is seated in the recess 30, which is resiliently supported radially between the bearing sleeve 26 and a damping plate 32. The damping plate 32 forms over its circumferential extension a part of the outer bearing surface 27, which comes into contact with the inner bearing surface 29 of the damping element 28.

Figure 8:
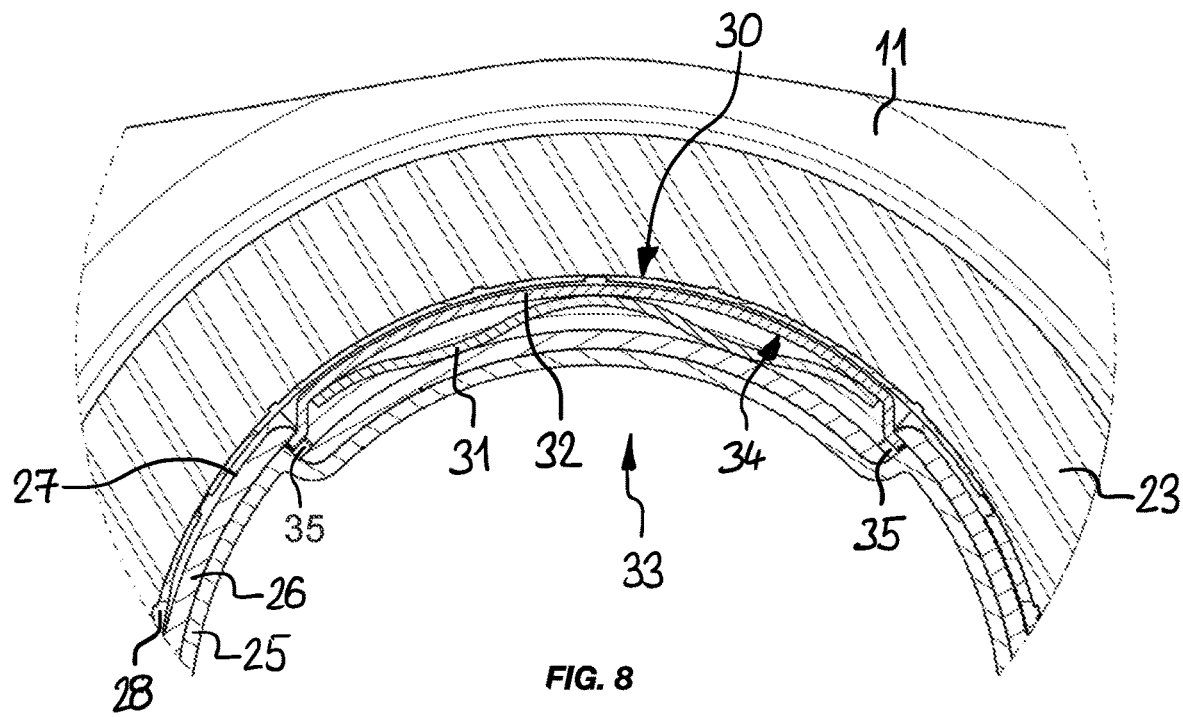
FIG. 8 is an enlarged section of the cross-section of the belt tensioning device according to FIG. 7 in the area of a damping mechanism in a central rotational position.

FIG. 8 shows the belt tensioning device 1 in the neutral position. In this central rotational position of the first tensioning arm 13, the damping element 28 is thinner in the radial direction over the circumferential extent of the recess 30 than in the other regions, thus forming a recess 34 that is recessed relative to the inner bearing surface 29. In the central rotational position of the first tensioning arm 13 shown in FIG. 8, the recess 34 of the damping element 28 is in overlap with the recess 30 of the bearing sleeve 26. The spring element 31 is thus maximally relaxed and acts on the damping plate 32 radially outwards in the direction of the damping element 28. In the present embodiment, the damping plate 32 is received at two circumferential ends in retaining recesses 35 which limit radial displacement of the damping plate 32. In the embodiment shown, in the central rotational position of the first tensioning arm 13, the damping plate 32 is configured so as not to come into contact with the damping element 28. In principle, however, it is also possible that in this central rotational position a contact between the damping plate 32 and the damping element 28 already takes place, in which case the contact force is limited by the retaining recesses 35.

Figure 9:
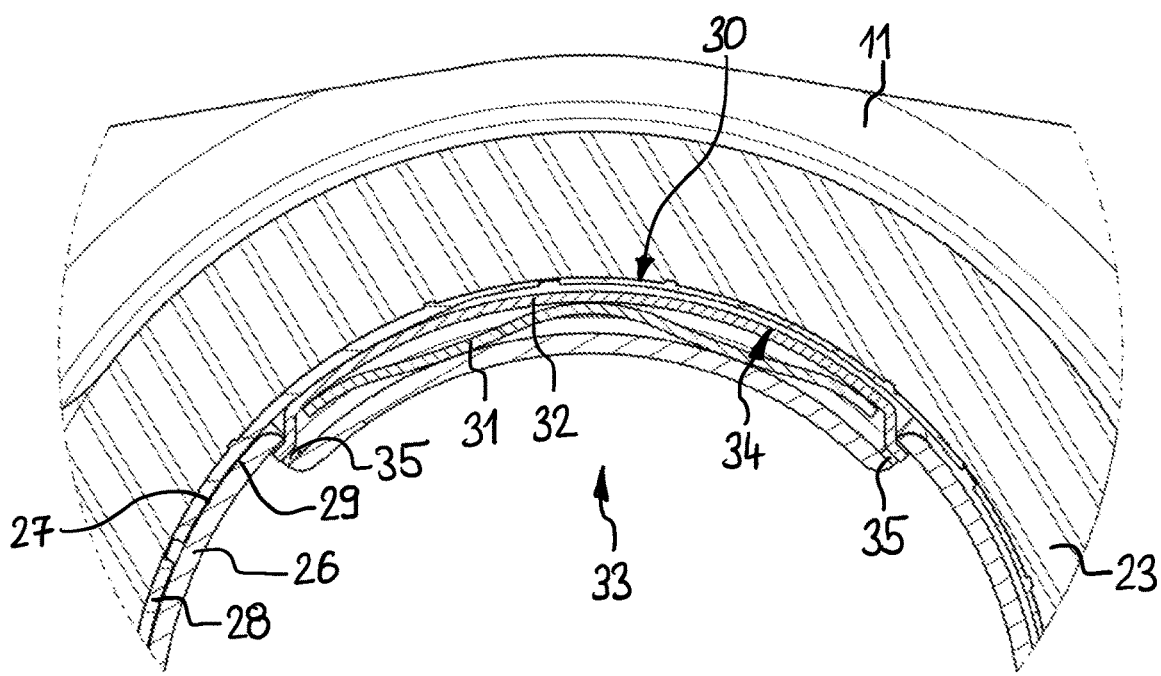
FIG. 9 is an enlarged section of the cross-section of the belt tensioning device according to FIG. 7 in the area of a damping mechanism in a disengaged rotational position.

In the pivoted-out rotational position of the first tensioning arm shown in FIG. 9, the annular portion 23 of the first tensioning arm 13 is rotated clockwise relative to the central projection 25. In this pivoted-out rotational position, the recess 30 of the bearing sleeve 26 and the recess 34 of the damping element 28 only partially overlap, so that a thicker region of the damping element 28 also overlaps with the recess 30 of the bearing sleeve 26. This thicker area of the damping element 28 presses the damping plate 32 inwards against the spring force of the spring element 31, whereby the outer bearing surface of the damping plate 32 comes into contact with the inner bearing surface 29 of the damping element 28 and is pressed in by the spring element 31, resulting in an increased frictional force and thus an increased damping torque compared to the rotational position as shown in FIG. 8.

The annular portion 24 of the second tensioning arm 14 is journaled with respect to the annular portion 23 of the first tensioning arm 13, wherein the bearing/journaling is not shown in detail here. A damping mechanism can also be provided in this bearing. The damping mechanism 33 shown between the central projection 25 of the base body 11 and the annular portion 23 of the first tensioning arm 13 provides a damping torque for damping vibrations between the assembly of the first tensioning arm 13 and the second tensioning arm 14 relative to the base body 11. Any damping mechanism between the first tensioning arm 13 and the second tensioning arm 14 would create a damping torque against vibrations between the two tensioning arms 13, 14.

Figure 10:
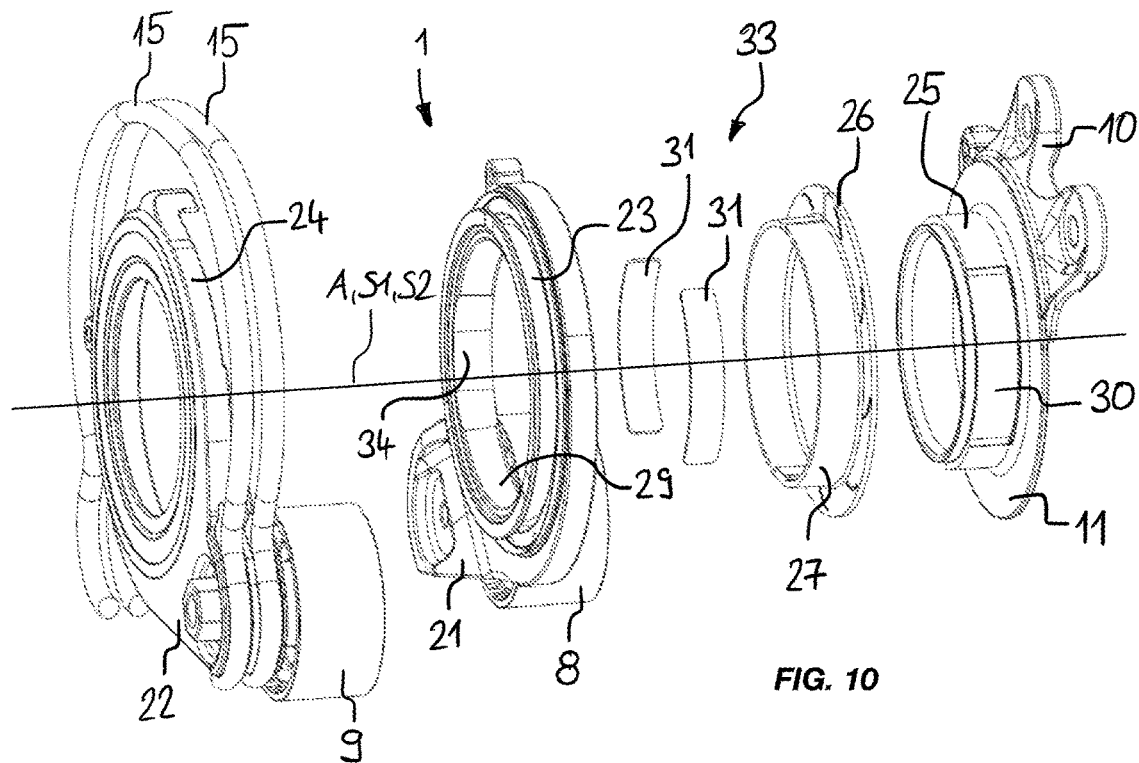
FIG. 10 is a perspective exploded view of a second embodiment of a belt tensioning device.
Figure 11:
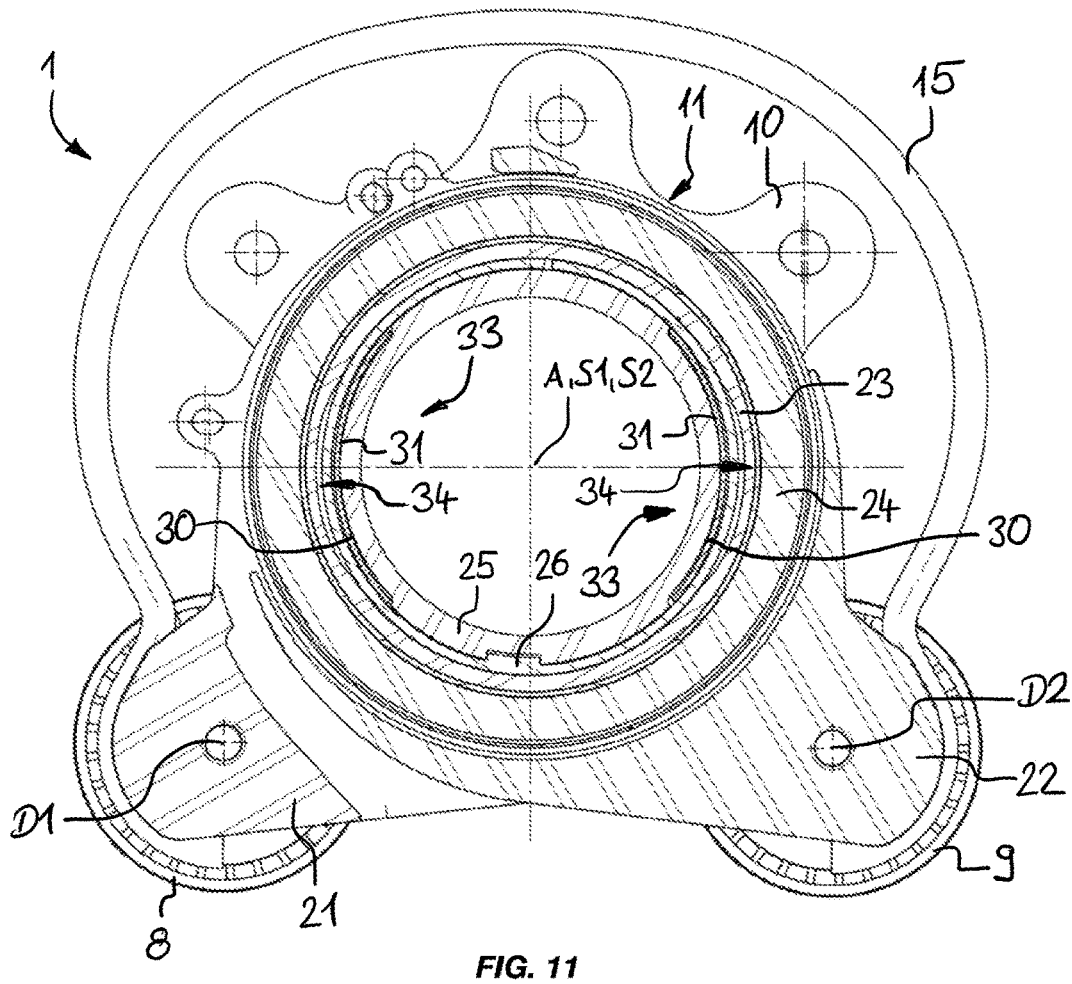
FIG. 11 is a cross-section of the belt tensioning device according to FIG. 10.
Figure 12:
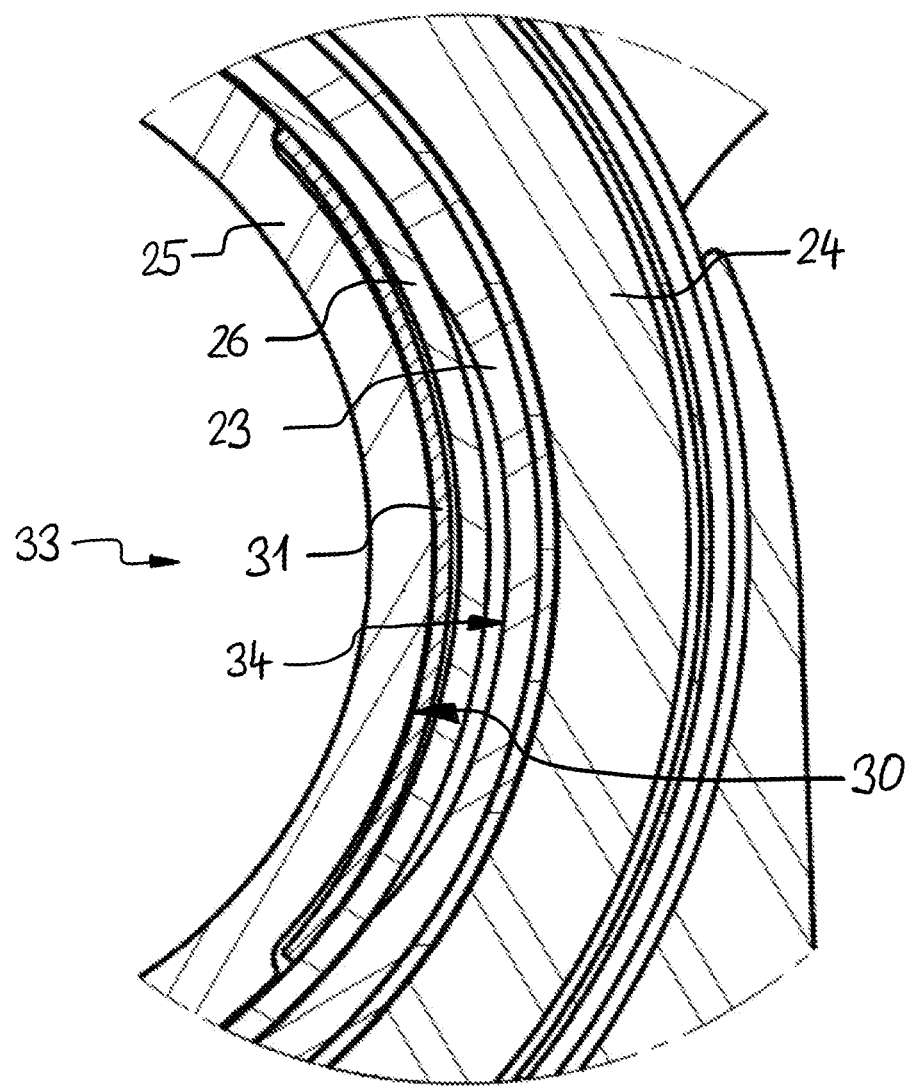
FIG. 12 is an enlarged section of the cross-section of the belt tensioning device according to FIG. 10 in the area of a damping mechanism in a central rotational position.

FIGS. 10 to 12, which will be described together below, show a second embodiment of a belt tensioning device 1 in various views. Components and details identical to those of the first embodiment are indicated by the same reference numbers and described in connection with the first embodiment. The main differences between the second embodiment and the first embodiment are described below.

Essentially, the second embodiment of the belt tensioning device 1 corresponds in structure to the first embodiment. In contrast to the first embodiment, the second embodiment comprises two springs 15 arranged side by side in the axial direction of the axis A. In the sleeve-shaped central projection 25 of the base body 11, two recesses 30 diametrically opposed to the axis A are provided, each extending over a limited circumferential area. A spring element 31 is seated in each of the recesses 30, which is arranged in a radially resilient manner between the central projection 25 and the bearing sleeve 26. The bearing sleeve 26 is thus subjected to radial outward force in the region of the spring elements 31.

In contrast to the first embodiment, the annular portion 23 of the first tensioning arm 13 does not have a damping element but directly forms the inner bearing surface 29. The inner bearing surface 29 is held in contact with the outer bearing surface 27 of the bearing sleeve 26.

The annular portion 23 of the first tensioning arm 13 has two recesses 34 facing inwardly towards the outer bearing surface 27. The recesses 34 are arranged diametrically with respect to the axis A on opposite sides of the annular portion 23 of the first tensioning arm 13. In the central rotational position of the first tensioning arm 13 shown in FIGS. 11 and 12, the recesses 34 are each in the same angular position about the axis A as a respective one of the spring elements 31. Thus, the bearing sleeve 26 is pressed or slightly deformed into the recesses 34 in the central rotational position of the first tensioning arm 13. In the embodiment shown, the outer bearing surface 27 is not in contact with the inner bearing surface 29 in the region of the spring elements 31.

In a (not shown) pivoted-out rotational position of the first tensioning arm 13, the recesses 24 are in a different angular position than the spring elements 31, so that the bearing sleeve 26 is acted upon by the spring elements 31 in the areas of the latter with force against the outer bearing surface 27, thereby generating an increased frictional force and thus an increased damping torque.

Figure 13:
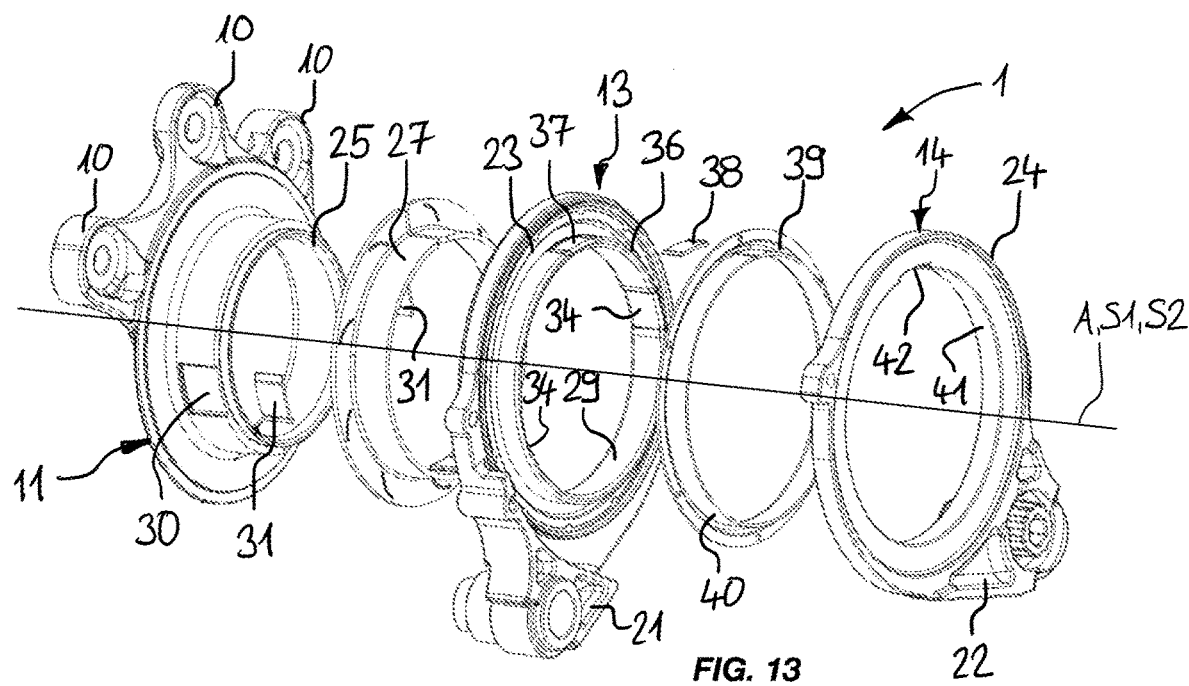
FIG. 13 is a perspective exploded view of a third embodiment of a belt tensioning device.
Figure 14:
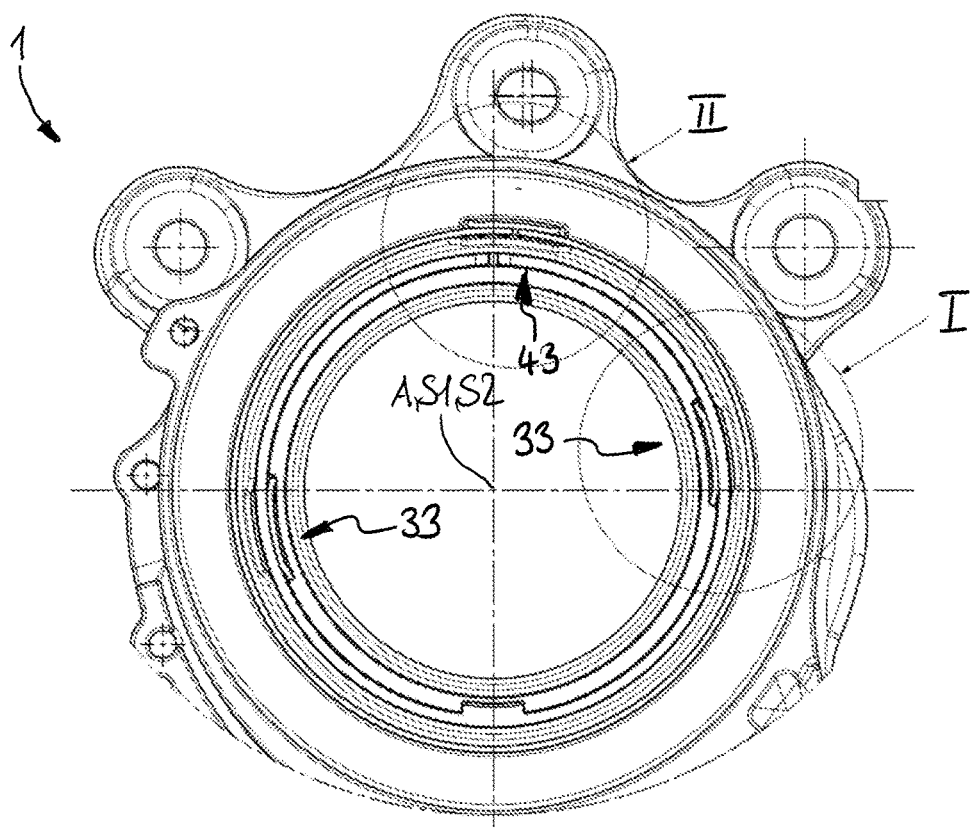
FIG. 14 is a schematic cross-section of the belt tensioning device shown in FIG. 13.

FIGS. 13 and 14, which will be described together below, show a third embodiment of a belt tensioning device 1 in various views. Components and details identical to those of the first two embodiments are indicated by the same reference numbers and described in connection with the first two embodiments. The main differences between the third embodiment and the first two embodiments are described below.

Essentially, the third embodiment of the belt tensioning device 1 corresponds in structure to the second embodiment. The third embodiment has two spring elements 31 which are shorter in the circumferential direction compared to the second embodiment. In all other respects, the function of the damping mechanism 33 between the base body 11 and the first tensioning arm 13 is identical to those of the second embodiment.

The annular portion 23 of the first tensioning arm 13 has a central sleeve portion 36, which is basically similar to the central projection 25 of the base body 11. The sleeve section 36 is coaxial with the axis A and the two pivot axes S1 and S2. The sleeve portion 36 is provided with an outwardly facing recess 37 extending around part of its circumference. A spring element 38 is seated in the recess 37.

A bearing sleeve 39 is seated on the sleeve portion 36, the spring element 38 being biased between the sleeve portion 26 of the first tensioning arm 13 and the bearing sleeve 39. The spring element 38 of the first tensioning arm 13 thus acts on the bearing sleeve 39 radially outwards. This is similar to the spring elements 31 on the base body 11.

An outer bearing surface 40 of the bearing sleeve 39 is in sliding contact with an inner bearing surface 41 of the annular portion 24 of the second tensioning arm 14. The annular portion 24 of the second tensioning arm 14 has a recess 24 extending from the inner bearing surface 41, and in a central rotational position of the first tensioning arm 13 relative to the second tensioning arm 14, the recess 24 is arranged in an angular position in which it is in overlapping relationship with the spring element 38 of the first tensioning arm 13. Thus, the region of the bearing sleeve 39 that is radially resiliently acted upon by the spring element 38 is deformed in the direction of the recess 4232 of the annular portion 24 of the second tensioning arm 14. In positions deviating from the central rotational position, the bearing sleeve 39 in the area of the spring element 38 of the first tensioning arm 13 is subjected to force against the inner bearing surface 41, thus generating an increased frictional force and thus an increased damping torque.

The damping mechanism 33 according to detail I in FIG. 14 and the diametrically opposed damping mechanism 33 thus damp a vibration of the unit comprising the first tensioning arm 13 and the second tensioning arm 14 relative to the base body 11. The damping mechanism 43 according to detail II in FIG. 14 dampens an oscillating movement between the two tensioning arms 13, 14 with respect to each other.

Figure 15:
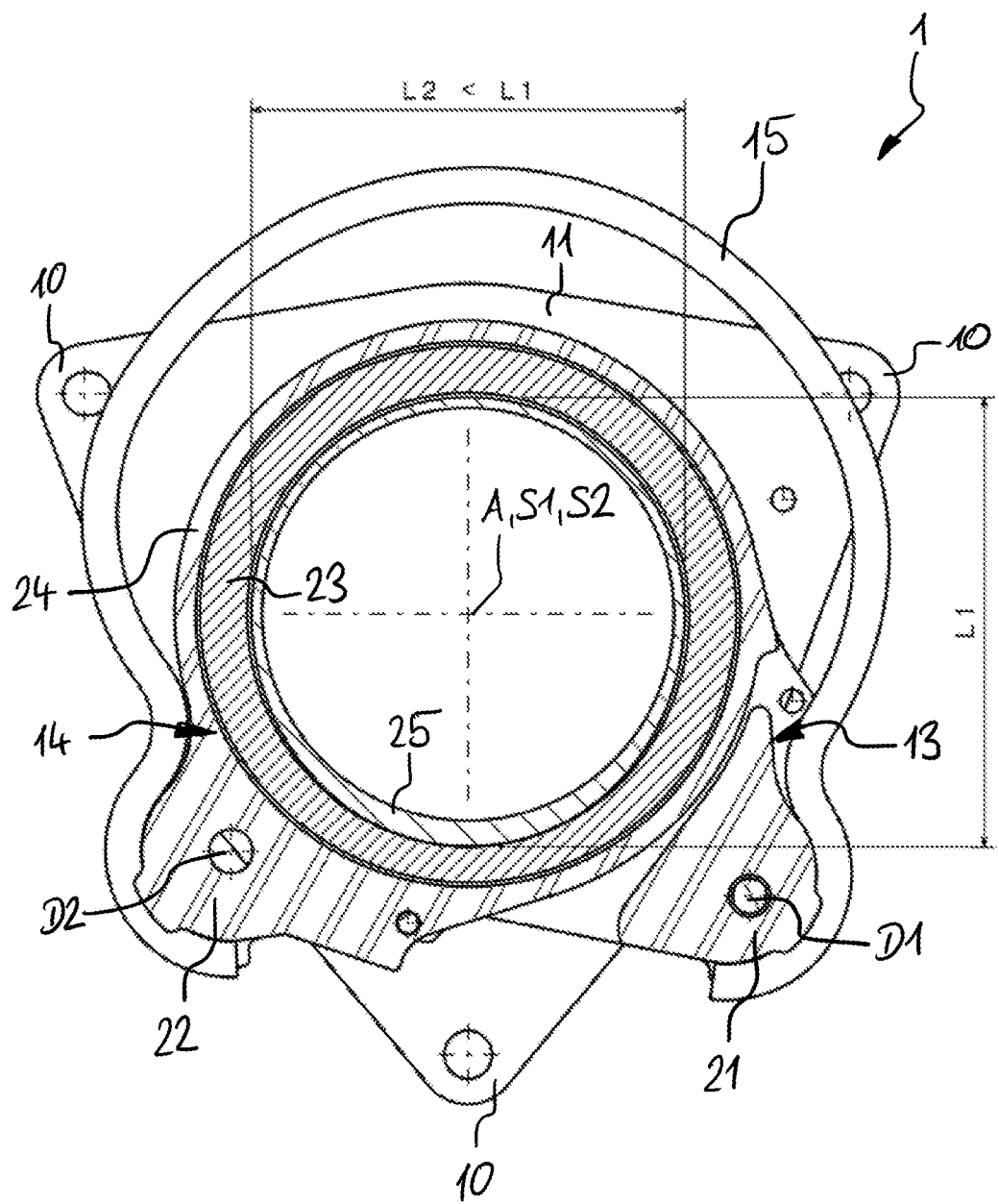
FIG. 15 is a cross-section of a fourth embodiment of a belt tensioning device.

FIG. 15 shows a schematic cross-section of a fourth embodiment of a belt tensioning device 1, wherein components and details identical to those of the preceding embodiments are marked with the same reference numbers and described in connection with the preceding embodiments. The main differences between the fourth embodiment and the preceding embodiments are explained below.

In contrast to the preceding embodiments, no spring element is provided between the base body 11 and the first tensioning arm 13. On the other hand, the outer bearing surface 27 of the central projection 25 and the inner bearing surface 29 of the annular portion 23 of the first tensioning arm 13 have an oval shape so that, in a vertical direction shown in FIG. 15, they have a length L1 greater than a horizontal length L2, in each case viewed transversely to the axis A. In the central rotational position of the first tensioning arm 13, the outer bearing surface 27 and the inner bearing surface 29 are identically aligned. In rotational positions deviating from the central rotational position, the elliptically shaped bearing surfaces 27, 29 are rotated relative to each other, so that the bearing clearance is reduced in certain areas and frictional forces are increased, resulting in an increased damping torque.

Alternative possibilities leading to the same result may include counter-rotating ramp surfaces on the at least substantially cylindrical bearing surfaces. Ramp surfaces may also be disposed on end surfaces of the base body 11 and the annular portion 23 of the first tensioning arm 13, which come into contact with each other.

Figure 16:
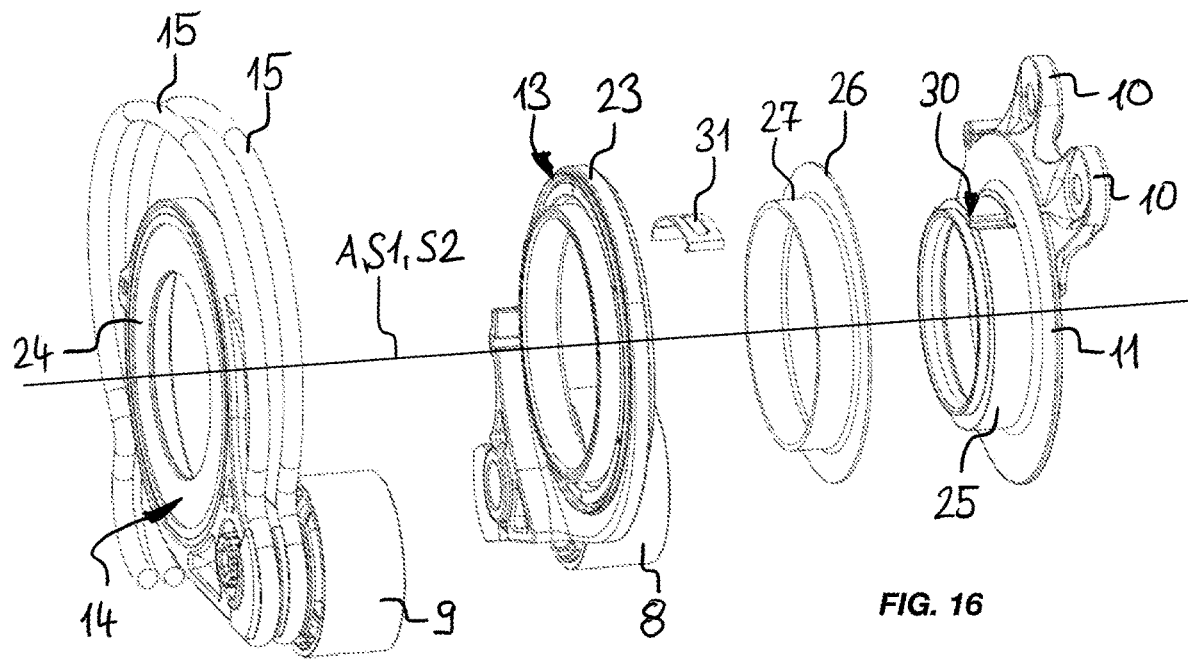
FIG. 16 is a perspective exploded view of a fifth embodiment of a belt tensioning device.
Figure 17:
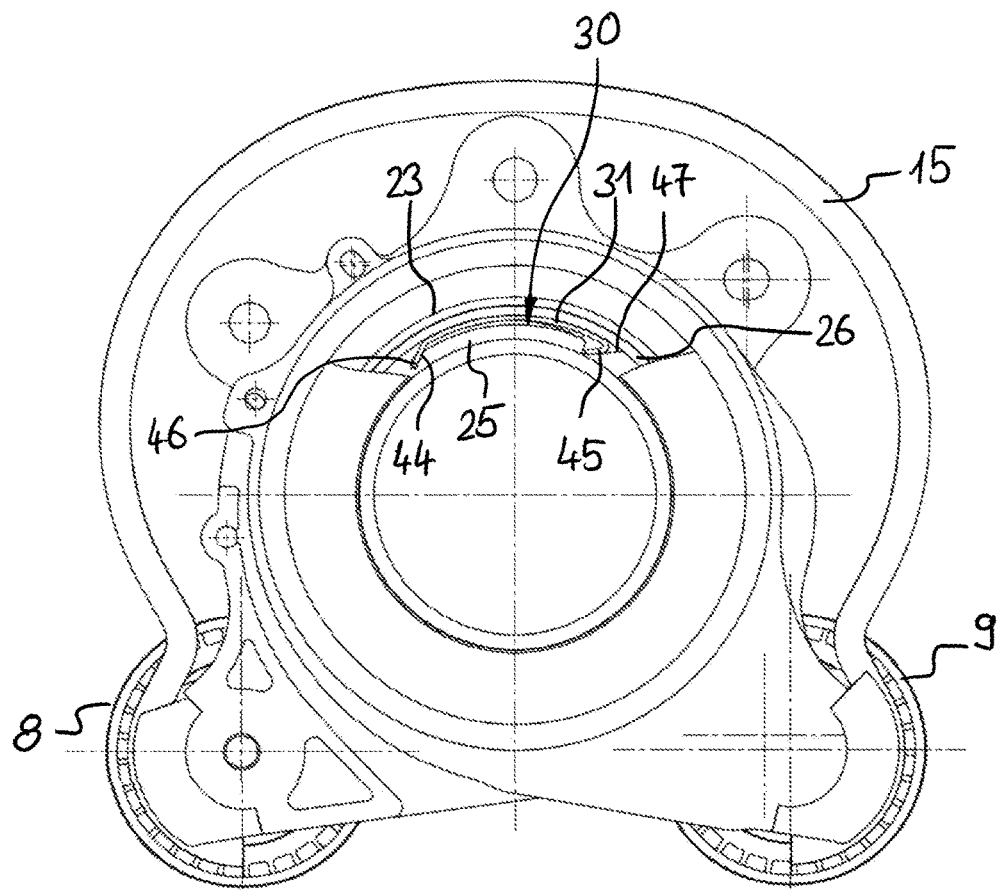
FIG. 17 is a partial cross-section of the belt tensioning device according to FIG. 16.

FIGS. 16 and 17, which will be described together below, show a fifth embodiment of a belt tensioning device 1 in various views. Components and details identical to those of the first or second embodiments are indicated by the same reference numbers and described in connection with the first and second embodiments. The main differences are explained below.

The central projection 25 has a recess 30 in which a spring element 31 is located. The spring element is radially resiliently supported against the bearing sleeve 26, which has the outer bearing surface 27 in frictional contact with the inner bearing surface 29 of the annular portion 23 of the first tensioning arm 13.

The spring element 31 has a ramp portion 44, 45 at each of its circumferential ends which are in sliding contact with ramp surfaces 46, 47 of the recess 30 of the central projection 25. The ramp sections 44, 45 and the ramp surfaces 46, 47 are designed in such a way that, in the case of a counterclockwise pivoting movement of the first tensioning arm 13 in FIG. 17, the spring element 31 is pressed deeper into the recess 30 and, in the case of a clockwise rotational movement, is pulled out of the recess 30 and is pressed radially inwards against the bearing sleeve 26, so that, compared with a counterclockwise rotational movement, increased bearing forces are produced between the inner bearing surface 29 and the outer bearing surface 27. This leads to an increased damping torque. This means that different damping torques can be achieved for different pivoting directions.

Figure 18:
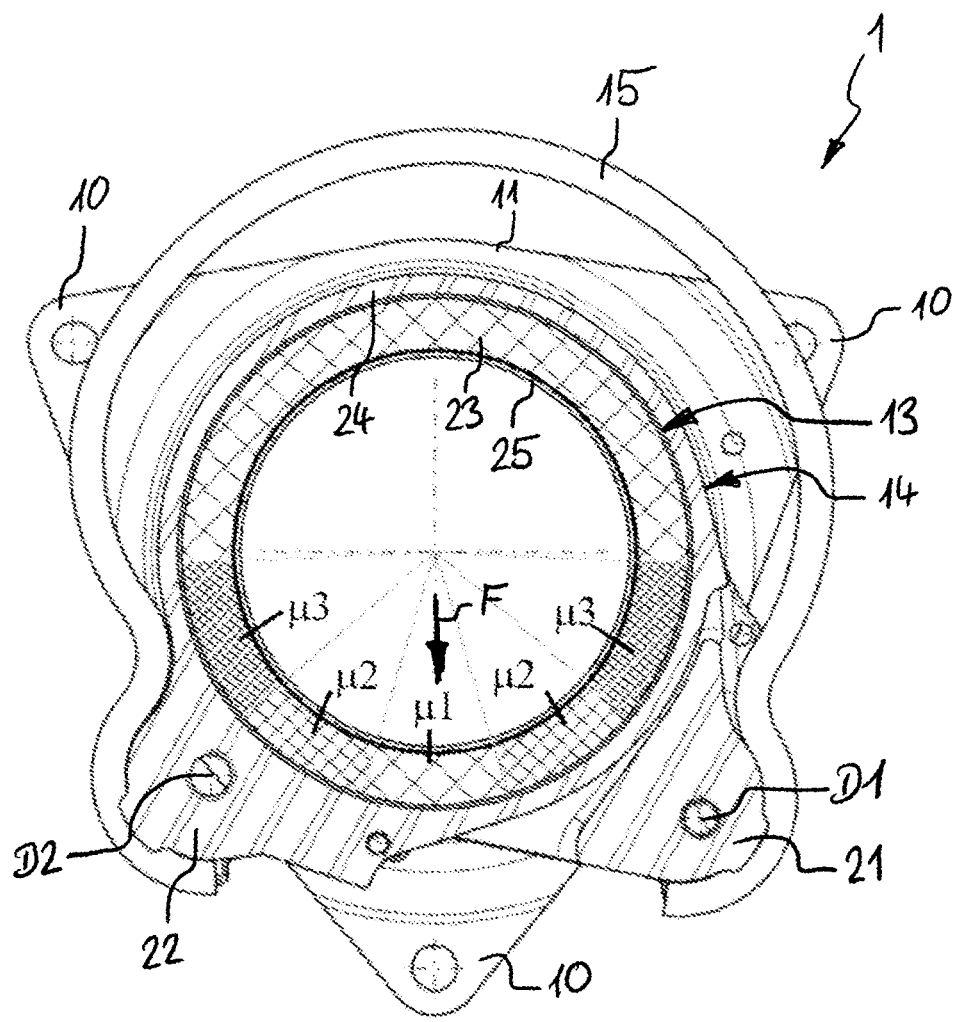
FIG. 18 is a schematic cross-section of a sixth embodiment of a belt tensioning device.

FIG. 18 shows a schematic cross-section of a sixth embodiment of a belt tensioning device, wherein components and details identical to the preceding embodiments are marked with the same reference numbers and are described in connection with the preceding embodiments. The main differences are explained below.

The sixth embodiment is similar in construction to the fourth embodiment, with the bearing surfaces 27, 29 being circular cylindrical. The outer bearing surface 27 of the central projection 25 and/or the inner bearing surface 29 of the first tensioning arm 13 or its bearing sleeve have varying surface properties over the circumference, so that varying friction coefficients are produced between the bearing surfaces. This can be achieved, for example, by varying materials or surface roughness.

In the installed state of the belt tensioning device 1, a radial force is generated in the direction of the force arrow F, which acts on the bearing surfaces 27, 29. This means that the area of the bearing surfaces 27, 29, which are oriented in the direction of the force F, have a higher influence on frictional forces than areas transverse to the direction of the force. In the present example, a friction coefficient µ1 is realized over an angular range around the force direction F. To the left and right of this, a friction coefficient µ2 is provided which is greater than the friction coefficient µ1. Further on, areas with again increased friction coefficients µ3 are provided. When the first pivot arm 13 is pivoted from the central rotational position shown in FIG. 18 to a pivoted-out rotational position, one of the areas with the friction coefficient µ2 or µ3 is in alignment with the force F, so that higher friction forces are obtained and thus higher damping torques.

LIST OF REFERENCE NUMBERS

1 Belt tensioning device
2 Belt drive
3 Starter generator
4 Belt
5 Pulley
6 Pulley
7 Pulley
8 Tensioning roller
9 Tensioning roller
10 Fastening lug
11 Base body
12 Screw
13 First tensioning arm
14 Second tensioning arm
15 Spring
16 First strand or side of the belt
17 Second strand or side of the belt
18 First spring support
19 Second spring support
20 Opening
21 Support portion
22 Support portion
23 Annular portion
24 Annular portion
25 Central projection
26 Bearing sleeve
27 Outer bearing surface
28 Damping element
29 Inner bearing surface
30 Recess
31 Spring element
32 Damping plate
33 Damping mechanism
34 Recess
35 Retaining recess
36 Sleeve portion
37 Recess
38 Spring element
39 Bearing sleeve
40 Outer bearing surface
41 Inner bearing surface
42 Recess
43 Damping mechanism
44 Ramp section
45 Ramp section
46 Ramp surface
47 Ramp surface
A Ax is
D Ax is of rotation
D1 Rotation axis of the first tensioning roller
D2 Rotation axis of the second tensioning roller
S1 First pivot axis
S2 Second pivot axis

The invention claimed is:

1. A belt tensioning device, comprising:
a base body,
a first tensioning arm, including a rotatable first tensioning roller, pivotably mounted on the base body such that the first tensioning arm is pivotable about a first pivot axis;
a second tensioning arm, including a rotatable second tensioning roller, pivotably mounted relative to the base body such that the second tensioning arm is pivotable about a second pivot axis;
a spring arrangement provided between the first tensioning arm and the second tensioning arm and via which the first tensioning arm and the second tensioning arm are resiliently supported against one another in a circumferential direction; and
a damping mechanism operatively arranged between the base body and the first tensioning arm for damping relative rotational movement between the first tensioning arm and the base body;
wherein the damping mechanism generates a varying damping torque dependent on at least one of a rotational position or a rotational direction of the first tensioning arm relative to the base body upon pivoting the first tensioning arm relative to the base body; and
wherein different values for a coefficient of friction exist over a circumference between a bearing surface of the base body and a bearing surface of the first tensioning arm.

2. The belt tensioning device of claim 1,
wherein in a central rotational position of the first tensioning arm relative to the base body, when the first tensioning arm is pivoted relative to the base body, the damping mechanism generates a damping torque which is smaller than a damping torque in at least one pivoted-out rotational position of the first tensioning arm relative to the base body which differs from the central rotational position.

3. The belt tensioning device of claim 1,
wherein a spring element is arranged radially between the base body and the first tensioning arm and is held in a rotationally fixed manner on one of the base body and the first tensioning arm,
wherein, in a central rotational position of the first tensioning arm relative to the base body, the spring element is arranged in a circumferential overlap with a recess in the other one of the base body and the first tensioning arm, and
wherein, in a pivoted-out rotational position of the first tensioning arm relative to the base body which differs from the central rotational position, the spring element is pretensioned and is arranged exerting a radial force between the bearing surface of the base body and the bearing surface of the first tensioning arm surface of the first tensioning arm.

4. The belt tensioning device of claim 1,
wherein between the bearing surface of the base body and the bearing surface of the first tensioning arm have a same cross-sectional profile in the circumferential direction, the cross-sectional profile deviating from a circular shape.

5. The belt tensioning device of claim 1,
wherein the damping mechanism generates a higher damping torque when the first tensioning arm is pivoted relative to the base body starting from a central rotational position of the first tensioning arm relative to the base body in a direction towards a pivoted-out rotational position which deviates from the central rotational position than when the first tensioning arm is pivoted relative to the base body starting from theft pivoted-out rotational position of the first tensioning arm relative to the base body in a direction towards the central rotational position.

6. The belt tensioning device of claim 1,
wherein a spring element is arranged radially between the base body and the first tensioning arm and is held in a rotationally fixed manner by one of the base body and the first tensioning arm, and
wherein the spring element is radially pretensioned in a first pivoting direction of the first tensioning arm relative to the base body and is arranged so as to be radially free in a second pivoting direction opposite the first pivoting direction.

7. The belt tensioning device of claim 1,
wherein the second tensioning arm is mounted on the first tensioning arm such that it can pivot about the second pivot axis, and
wherein a damping mechanism is operatively arranged between the first tensioning arm and the second tensioning arm for damping a relative rotational movement between the first tensioning arm and the second tensioning arm.

8. A belt tensioning device, comprising:
a base body;
a first tensioning arm, including a rotatable first tensioning roller, pivotably mounted on the base body such that the first tensioning arm is pivotable about a first pivot axis;
a second tensioning arm, including a rotatable second tensioning roller, pivotably mounted relative to the base body such that the second tensioning arm is pivotable about a second pivot axis;
a spring arrangement provided between the first tensioning arm and the second tensioning arm and via which the first tensioning arm and the second tensioning arm are resiliently supported against one another in a circumferential direction; and
a damping mechanism operatively arranged between the base body and the first tensioning arm for damping relative rotational movement between the first tensioning arm and the base body;
wherein the damping mechanism generates a varying damping torque de-pendent on at least one of a rotational position or a rotational direction of the first tensioning arm relative to the base body upon pivoting the first tensioning arm relative to the base body;
wherein a spring element is arranged radially between the base body and the first tensioning arm and is held in a rotationally fixed manner on one of the base body and the first tensioning arm;
wherein, in a central rotational position of the first tensioning arm relative to the base body, the spring element is arranged in a circumferential overlap with a recess in the other one of the base body and the first tensioning arm; and
wherein, in a pivoted-out rotational position of the first tensioning arm relative to the base body which differs from the central rotational position, the spring element is pretensioned and is arranged exerting a radial force between a bearing surface of the base body and a bearing surface of the first tensioning arm.

9. The belt tensioning device of claim 8,
wherein in the central rotational position of the first tensioning arm relative to the base body, when the first tensioning arm is pivoted relative to the base body, the damping mechanism generates a damping torque which is smaller than a damping torque in the pivoted-out rotational position of the first tensioning arm relative to the base body which differs from the central rotational position.

10. The belt tensioning device of claim 8,
wherein different values for a coefficient of friction exist over a circumference between the bearing surface of the base body and the bearing surface of the first tensioning arm.

11. The belt tensioning device of claim 8,
wherein between the bearing surface of the base body and the bearing surface of the first tensioning arm have a same cross-sectional profile in the circumferential direction, the cross-sectional profile deviating from a circular shape.

12. The belt tensioning device of claim 8,
wherein the damping mechanism generates a higher damping torque when the first tensioning arm is pivoted relative to the base body starting from the central rotational position the first tensioning arm relative to the base body in a direction towards the pivoted-out rotational position which deviates from the central rotational position than when the first tensioning arm is pivoted relative to the base body starting from the pivoted-out rotational position of the first tensioning arm relative to the base body in a direction towards the central rotational position.

13. The belt tensioning device of claim 8, wherein the spring element is radially pretensioned in a first pivoting direction of the first tensioning arm relative to the base body and is arranged so as to be radially free in a second pivoting direction opposite the first pivoting direction.

14. A belt tensioning device, comprising:
a base body;
a first tensioning arm, including a rotatable first tensioning roller, pivotably mounted on the base body such that the first tensioning arm is pivotable about a first pivot axis;
a second tensioning arm, including a rotatable second tensioning roller, pivotably mounted relative to the base body such that the second tensioning arm is pivotable about a second pivot axis;
a spring arrangement provided between the first tensioning arm and the second tensioning arm and via which the first tensioning arm and the second tensioning arm are resiliently supported against one another in a circumferential direction; and
a damping mechanism operatively arranged between the base body and the first tensioning arm for damping relative rotational movement between the first tensioning arm and the base body;
wherein the damping mechanism generates a varying damping torque de-pendent on at least one of a rotational position or a rotational direction of the first tensioning arm relative to the base body upon pivoting the first tensioning arm relative to the base body, and wherein a bearing surface of the base body and a bearing surface of the first tensioning arm have a same cross-sectional profile in the circumferential direction, the cross-sectional profile having an oval shape.

15. The belt tensioning device of claim 14,
wherein in a central rotational position of the first tensioning arm relative to the base body, when the first tensioning arm is pivoted relative to the base body, the damping mechanism generates a damping torque which is smaller than a damping torque in at least one pivoted-out rotational position of the first tensioning arm relative to the base body which differs from the central rotational position.

16. The belt tensioning device of claim 14,
wherein different values for a coefficient of friction exist over a circumference between between the bearing surface of the base body and the bearing surface of the first tensioning arm.

17. The belt tensioning device of claim 14,
wherein the damping mechanism generates a higher damping torque when the first tensioning arm is pivoted relative to the base body starting from a central rotational position of the first tensioning arm relative to the base body in a direction towards a pivoted-out rotational position which deviates from the central rotational position than when the first tensioning arm is pivoted relative to the base body starting from the pivoted-out rotational position of the first tensioning arm relative to the base body in a direction towards the central rotational position.

18. The belt tensioning device of claim 14,
wherein a spring element is arranged radially between the base body and the first tensioning arm and is held in a rotationally fixed manner by one of the base body and the first tensioning arm, and
wherein the spring element is radially pretensioned in a first pivoting direction of the first tensioning arm relative to the base body and is arranged so as to be radially free in a second pivoting direction opposite the first pivoting direction.

\* \* \* \* \*

UNITED STATES PATENT AND TRADEMARK OFFICE
CERTIFICATE OF CORRECTION

PATENT NO. : 11,629,778 B2
APPLICATION NO. : 17/372731
DATED : April 18, 2023
INVENTOR(S) : Florian Stadermann et al.

It is certified that error appears in the above-identified patent and that said Letters Patent is hereby corrected as shown below:

In the Claims

Column 14, in Line 67, in Claim 4, replace "tensioning arm have a" with -- tensioning arm has a --.

Column 15, in Line 55, in Claim 8, replace "torque de-pendent on at" with -- torque dependent on at --.

Column 16, in Line 23, in Claim 11, replace "tensioning arm have a" with -- tensioning arm has a --.

Column 16, in Line 64, in Claim 14, replace "torque de-pendent on at" with -- torque dependent on at --.

Column 17, in Line 16, in Claim 16, replace "circumference between between the bearing" with -- circumference between the bearing --.

Signed and Sealed this
Thirteenth Day of June, 2023

Katherine Kelly Vidal
*Director of the United States Patent and Trademark Office*